United States Patent
Yao et al.

(10) Patent No.: US 10,972,535 B2
(45) Date of Patent: Apr. 6, 2021

(54) METHOD AND DEVICE FOR LOAD BALANCING, AND STORAGE MEDIUM

(71) Applicant: Beijing Baidu Netcom Science and Technology Co., Ltd., Beijing (CN)

(72) Inventors: Guang Yao, Beijing (CN); Miao Zhang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 30 days.

(21) Appl. No.: 16/451,224

(22) Filed: Jun. 25, 2019

(65) Prior Publication Data
US 2019/0364103 A1 Nov. 28, 2019

(30) Foreign Application Priority Data
Aug. 20, 2018 (CN) .......................... 201810948960.9

(51) Int. Cl.
G06F 15/173 (2006.01)
H04L 29/08 (2006.01)

(52) U.S. Cl.
CPC ...... H04L 67/1029 (2013.01); H04L 67/1008 (2013.01); H04L 67/1014 (2013.01)

(58) Field of Classification Search
CPC ............. H04L 67/1029; H04L 67/1008; H04L 67/1014
USPC ........................................................ 709/223
See application file for complete search history.

(56) References Cited

U.S. PATENT DOCUMENTS 9,088,501 B2 * 7/2015 Chaudhary ............ H04L 47/125
9,130,954 B2 * 9/2015 Joshi .................... H04L 67/1021
9,143,558 B2 * 9/2015 Blander .............. H04L 67/1029
9,160,792 B2 * 10/2015 Bali ..................... H04L 67/1008
9,407,692 B2 * 8/2016 Rajagopalan ....... H04L 67/1014
9,515,955 B2 * 12/2016 Arikatla ................. G06F 9/505
9,516,104 B2 * 12/2016 Ghozati ............. H04L 67/1014
9,531,590 B2 * 12/2016 Jain .......................... H04L 69/22
9,560,124 B2 * 1/2017 Eisenbud ............ H04L 67/1029
(Continued)

FOREIGN PATENT DOCUMENTS

CN 103391299 A 11/2013
CN 104144227 A 11/2014
(Continued)

OTHER PUBLICATIONS

Office Action for Chinese Application No. 201810948960.9, dated Sep. 3, 2020, 14 pages.

*Primary Examiner* — Melvin H Pollack
(74) *Attorney, Agent, or Firm* — Patterson Thuente Pedersen, P.A.

(57) ABSTRACT

Embodiments of a method, device, and terminal apparatus for load balancing and a storage medium are provided. The method can include acquiring a service traffic of a service request received by at least one load balancer configured for an equipment room of a plurality of equipment rooms, acquiring a dispatching result of the load balancer, according to the service traffic of the service request and a service capacity of the equipment room, and pushing the dispatching result to a distribution proportion configuration center configured to send the dispatching result to the load balancer, where the dispatching result is used to indicate the load balancer to distribute the service request to one or more equipment rooms.

15 Claims, 7 Drawing Sheets

(56) References Cited

U.S. PATENT DOCUMENTS

| | | | |
|---|---|---|---|
| 9,591,018 B1 * | 3/2017 | Zakian | H04L 63/1416 |
| 9,626,275 B1 * | 4/2017 | Hitchcock | G06F 11/3093 |
| 9,680,764 B2 * | 6/2017 | Prakash | H04L 63/08 |
| 9,774,537 B2 * | 9/2017 | Jain | H04L 67/1029 |
| 9,887,932 B1 * | 2/2018 | Uppal | H04L 47/76 |
| 9,992,155 B2 * | 6/2018 | Pannese | H04L 67/1095 |
| 9,998,530 B2 * | 6/2018 | Cui | H04L 67/1034 |
| 10,063,419 B2 * | 8/2018 | Horstmann | H04L 67/1008 |
| 10,091,061 B1 * | 10/2018 | Peterson | H04L 41/5054 |
| 10,142,353 B2 * | 11/2018 | Yadav | H04L 63/02 |
| 10,142,407 B2 * | 11/2018 | Borst | H04L 67/1031 |
| 10,182,129 B1 * | 1/2019 | Peterson | H04L 41/5009 |
| 10,193,852 B2 * | 1/2019 | Kommula | H04L 29/12066 |
| 10,205,701 B1 * | 2/2019 | Voss | H04L 61/1511 |
| 10,341,241 B2 * | 7/2019 | Su | H04L 47/2441 |
| 10,560,543 B2 * | 2/2020 | Katsev | H04L 67/02 |
| 10,567,288 B1 * | 2/2020 | Mutnuru | H04L 67/1021 |
| 10,579,432 B1 * | 3/2020 | Anderson | H04L 67/1008 |
| 2015/0134929 A1 | 5/2015 | Anderson et al. | |
| 2015/0319233 A1 * | 11/2015 | Lv | H04L 67/1029 709/224 |
| 2018/0139269 A1 * | 5/2018 | Wu | H04L 67/16 |
| 2018/0262351 A1 * | 9/2018 | Liu | H04L 67/101 |
| 2018/0262559 A1 * | 9/2018 | Arya | H04L 67/1002 |
| 2020/0137151 A1 * | 4/2020 | Chi | H04L 67/327 |
| 2020/0287794 A1 * | 9/2020 | Rastogi | H04L 41/5025 |

FOREIGN PATENT DOCUMENTS

| | | |
|---|---|---|
| CN | 104601486 A | 5/2015 |
| CN | 105049536 A | 11/2015 |
| CN | 105141541 A | 12/2015 |
| CN | 105282191 A | 1/2016 |
| CN | 105450716 A | 3/2016 |
| CN | 107295045 A | 10/2017 |
| CN | 107295048 A | 10/2017 |
| CN | 104023068 B | 12/2017 |

* cited by examiner

PRIOR ART

METHOD AND DEVICE FOR LOAD BALANCING, AND STORAGE MEDIUM

CROSS-REFERENCE TO RELATED APPLICATION

This application claims priority to Chinese Patent Application No. 201810948960.9, filed on Aug. 20, 2018, which is hereby incorporated by reference in its entirety.

TECHNICAL FIELD

The present disclosure relates to a field of computer technology, and in particular, to a method and device for load balancing, and a storage medium therefor.

BACKGROUND

In order to achieve purposes such as disaster tolerance of a network service, or providing services close to a user's location, systems providing a service are typically deployed in a plurality of equipment rooms in one or more data centers. In this case, the data traffic of a user accessing the system needs to be dispatched among the plurality of equipment rooms for the purpose of balancing load, fault prevention, and so on. The technique of dispatching traffic among multiple equipment rooms is collectively referred to as global load balancing.

Figure 1:
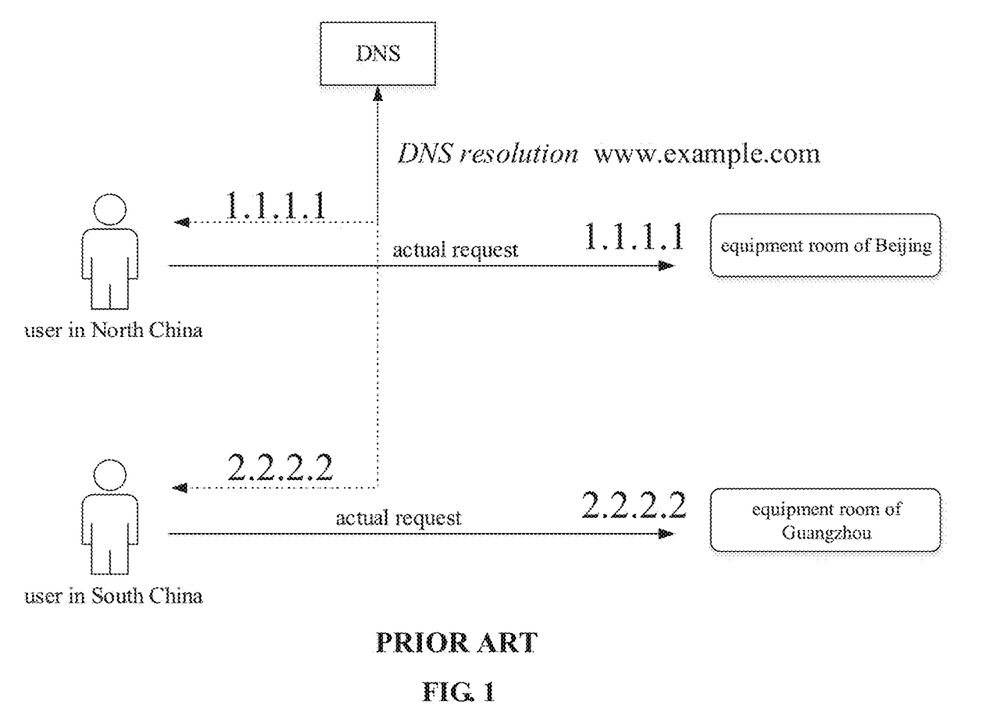
FIG. 1 is schematic diagram depicting a conventional method for load balancing.

As can be seen in FIG. 1, global load balancing is generally implemented based on a Domain Name System (DNS). Users are first divided by region (e.g., Beijing, Tianjin). Then, an Internet Protocol (IP) address is selected for a user corresponding to each region. When a user of a region requests the parsing of a domain name of a service, the IP address selected for the user in the region is returned, and traffic of the user in the region is directed to the equipment room corresponding to the IP address. In this manner, the following effects can be achieved:

1. Load balancing: By dispatching the users' traffic into equipment rooms in respective regions according to the regions where the users are located, the load of each equipment room can be adjusted to realize load balancing.

2. Fault prevention: When one equipment room fails, the IP address mapped to the failed equipment room can be adjusted to the IP address of any one of the other equipment rooms, such that user traffic is transferred to a functioning equipment room for the purpose of stopping loss.

However, global load balancing based on DNS can have the following disadvantages:

1. The dispatching takes effect slowly. The DNS needs to clear the cache every time the address is parsed. Thus, the dispatching takes effect slowly, up to for ten minutes or even several hours.

2. Inaccurate dispatching. When the equipment rooms are excessively divided by region, it is difficult to accurately divide the regions to which the users belongs, in particular where a local domain name (local DNS) is used by users in different regions. Therefore, it is difficult for DNS dispatching to accurately dispatch user traffic to various regions, and the effect of load balancing often does not meet expectations.

SUMMARY

A method and device, storage medium, and a terminal apparatus for load balancing are provided according to embodiments of the present disclosure, so as to at least solve the above technical problems in the existing technology.

According to a first aspect, a method for load balancing includes acquiring a service traffic of a service request received by at least one load balancer configured for an equipment room of a plurality of equipment rooms acquiring a dispatching result of the load balancer, according to the service traffic of the service request and a service capacity of the equipment room and pushing the dispatching result to a distribution proportion configuration center configured to send the dispatching result to the load balancer, wherein the dispatching result is used to indicate the load balancer to distribute the service request to one or more equipment rooms.

In embodiments, the acquiring of a service traffic of a service request received by at least one load balancer of an equipment room of a plurality of equipment rooms includes acquiring, by a traffic collector of the equipment room, a request rate of the service request received by the load balancer of the equipment room in a time period, receiving, by a global traffic aggregator, the request rate from the traffic collector of the equipment room, and calculating the service traffic of the service request received by the load balancer of the equipment room, according to the request rate of the load balancer of the equipment room and the time period.

In embodiments the method further includes counting a global traffic according to the service traffics of the service requests received by the load balancers of equipment rooms, counting a global capacity according to the service capacities of the equipment rooms, determining whether the global traffic is greater than the global capacity, and adjusting the service capacities of the equipment rooms in a case that the global traffic is greater than the global capacity.

In embodiments, the adjusting the service capacities of the equipment rooms includes dividing the global traffic by the global capacity to acquire a global load coefficient and multiplying the service capacities of the equipment rooms by the global load coefficient to acquire the adjusted service capacities of the equipment rooms.

In embodiments, the acquiring a dispatching result of the load balancer, according to the service traffic of the service request and a service capacity of the equipment room includes calculating a proportion of distribution to the equipment room, a remaining service traffic and a remaining service capacity of the equipment room, in a principle that the equipment room for which the load balancer is configured has a high priority for distributing the service request, according to the service traffic of the service request received by the load balancer of the equipment room and the service capacity of the equipment room, and dividing the remaining service traffic of the equipment room by the service traffic of the equipment room to acquire a distribution proportion of the service request, when the remaining service traffic of the equipment room is not zero, wherein the distribution proportion is to be distributed from the equipment room to at least one different equipment room with a non-zero remaining service capacity.

In embodiments, the calculating of a proportion of distribution to each equipment room, a remaining service traffic and a remaining service capacity of the each equipment room, includes: when the service traffic of the load balancer of the equipment room is not greater than the service capacity of the equipment room, setting the proportion of distribution to the equipment room for which the load balancer is configured to be 100%, the remaining service traffic of the equipment room to be zero, and the remaining service capacity of the equipment room to be a difference between the service capacity and the service traffic, and when the service traffic is greater than the service capacity, setting the proportion of distribution to the equipment room for which the load balancer is configured to be a ratio of the service capacity to the service traffic, the remaining service traffic in the equipment room to be a difference between the service traffic and the service capacity, and the remaining service capacity of the equipment room to be zero.

In embodiments the method further includes calculating a distribution proportion of the service request as a discarding proportion of the service request discarded by the load balancer of the equipment room, wherein the distribution proportion is to distributed from the equipment room to at least one different equipment room with a non-zero remaining capacity, and discarding the service request according to the discarding proportion of the service request when the global traffic is greater than the global capacity.

According to a second aspect, a method for load balancing includes acquiring a dispatching result of a load balancer from a distribution proportion configuration center, wherein the dispatching result is used to indicate the load balancer to distribute a service request to one or more equipment rooms, and is acquired according to a service traffic of the service request received by at least one load balancer configured for an equipment room of a plurality of equipment rooms and a service capacity of the equipment room, receiving a service request from a request terminal, and dispatching the received service request according to the dispatching result.

In embodiments, dispatching the received service request according to the dispatching result includes establishing a predetermined number of hash buckets, determining equipment rooms corresponding to the respective hash buckets according to the dispatching result, calculating a hash result according to a header field of the service request, to determine a hash bucket and determining an equipment room for processing the service request according to the determined hash bucket.

According to a third aspect, a device for load balancing includes a service traffic acquiring module, configured to acquire a service traffic of a service request received by at least one load balancer configured for an equipment room of a plurality of equipment rooms; a dispatching result calculating module, configured to acquire a dispatching result of the load balancer, according to the service traffic of the service request and a service capacity of the equipment room; and a dispatching result pushing module configured to push the dispatching result to a distribution proportion configuration center configured to send the dispatching result to the load balancer, wherein the dispatching result is used to indicate the load balancer to distribute the service request to one or more equipment rooms.

In embodiments, the device further includes: a global traffic counting module, configured to count a global traffic according to, the service traffics of the service requests received by the load balancers in equipment rooms, a global capacity counting module, configured to count a global capacity according to the service capacities of the equipment rooms, an excess determining module, configured to determine whether the global traffic is greater than the global capacity and a service capacity adjusting module, configured to adjust the service capacities of the equipment rooms in a case that the global traffic is larger than the global capacity.

In embodiments, the dispatching result calculating module includes a first calculating unit configured to calculate a proportion of distribution to the equipment room, a remaining service traffic and a remaining service capacity of the equipment room, in a principle that the equipment room for which the load balancer is configured has a high priority for distributing the service request, according to the service traffic of the service request received by the load balancer of the equipment room and the service capacity of the equipment room and a second calculating unit configured to divide the remaining service traffic of the equipment room by the service traffic of the equipment room to acquire a distribution proportion of the service request, in a case that the remaining service traffic of the equipment room is not zero, wherein the distribution proportion is to be distributed from the equipment room to at least one different equipment room with a non-zero remaining service capacity.

According to a fourth aspect, a device for load balancing includes a dispatching result acquiring module, configured to acquire a dispatching result of a load balancer from a distribution proportion configuration center, wherein the dispatching result is used to indicate the load balancer to distribute a service request to one or more equipment rooms, and is acquired according to a service traffic of the service request received by at least one load balancer configured for an equipment room of a plurality of equipment rooms and a service capacity of the equipment room, a service request receiving module, configured to receive a service request from a request terminal, a dispatching module, configured to dispatch the received service request according to the dispatching result.

In embodiments, the dispatching module includes a hash bucket establishing unit, configured to establish a predetermined number of hash buckets an equipment room correspondence unit, configured to determine equipment rooms corresponding to the respective hash buckets according to the dispatching result a hash bucket determining unit, configured to calculate a hash result according to a header field of the service request, to determine a hash bucket, and an equipment room determining unit, configured to determine an equipment room for processing the service request according to the determined hash bucket.

In a possible design, the device for load balancing includes a processor and a memory for store a program that, when executed by the processor, cause the processor to implement the method for load balancing. The device for load balancing may further include a communication interface for communicating with other devices or communication networks.

In a fifth aspect, a non-transitory computer-readable storage medium is provided for storing computer software instructions used by the device for load balancing, the storage medium includes programs involved in execution of the above method.

One of the above technical solutions has the following advantages or beneficial effects: according to the embodiment of the present disclosure, the service traffic of the load balancer of each equipment room can be acquired in real time, and then the real-time dispatching result can be calculated based on the acquired service traffic and the service capacity in each equipment room, and the dispatching result can be pushed to the distribution proportion configuration center. The latest dispatching results may be acquired by the load balancer from the distribution proportion configuration center for dispatching. The calculation process of the dispatching result is separated from the execution process of the dispatching, so that the real-time dispatching can be quickly performed. The dispatching result is calculated based on the service traffic of the load balancer of each equipment room and the service capacity of each equipment room, so that the service request can be accurately distributed to balance the load.

The above summary is for the purpose of the specification only and is not intended to limit in any way. In addition to the illustrative aspects, embodiments, and features described above, further aspects, embodiments, and features of the present disclosure will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present disclosure and are not to be considered as limiting the scope of the present disclosure.

DETAILED DESCRIPTION

In the following, only certain example embodiments are briefly described. As those skilled in the art would realize, the described embodiments may be modified in various different ways, all without departing from the spirit or scope of the present disclosure. Accordingly, the drawings and description are to be regarded as illustrative in nature and not restrictive.

Figure 2:
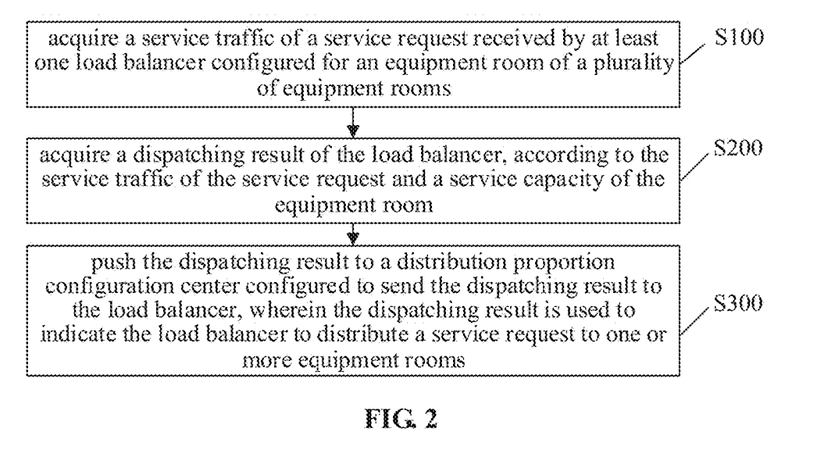
FIG. 2 is a schematic flowchart depicting a method for load balancing according to an embodiment.

With reference to FIG. 2, a method for load balancing is provided according to an embodiment of the present disclosure, the method may be applied to a dispatching center. The dispatching center may include a computer, a microcomputer and the like. For example, a dispatching result can be calculated by using a dispatcher in embodiments. At S100, a service traffic of a service request received by at least one load balancer configured for an equipment room of a plurality of equipment rooms is acquired. The service traffic may include the entire traffic of the service requests received by load balancers of one equipment room for the past one period of time.

A system for processing the service request from a request terminal may include a plurality of equipment rooms, which may be distributed in the same or different areas. Each equipment room can include at least one server for processing the service request and at least one load balancer.

Optionally, the load balancer may include a two-layer, three-layer, four-layer, seven-layer load balancer, or the like. A real Medium Access Control (MAC) address may be designated by the two-layer load balancer based on a service request from a virtual MAC address. A real Internet Protocol (IP) address may be designated by the three-layer load balancer based on a service request from a virtual IP address. A real server may be designated by the four-layer load balancer based on a service request from a virtual IP address plus a port. A real server may be designated by the seven-layer load balancer based on a service request from a virtual Uniform Resource Locator (URL) or a host name.

At S200, a dispatching result of the load balancer is acquired, according to the service traffic of the service request and a service capacity of the equipment room. The service capacity is a total amount of service requests that can be processed by servers of one equipment room.

The dispatching results may include distribution proportions as distributed by the load balancer to one or more of the available equipment rooms. The dispatching results can further include a discarding proportion indicating a proportion of the received service request that is discarded by the load balancer. Other dispatching results of this type can be acquired, in embodiments.

At S300, the dispatching result is pushed to a distribution proportion configuration center configured to send the dispatching result to the load balancer, wherein the dispatching result is used to indicate to the load balancer to distribute the service request to one or more equipment rooms.

In this embodiment, a distribution proportion configuration center can be provided in each equipment room, such that the dispatching result can be quickly acquired from the distribution proportion configuration center by the load balancer of each equipment room. Therefore, in the process of pushing the dispatching result, the dispatching result can be pushed to the distribution proportion configuration center of the corresponding equipment room according to the respective equipment rooms. The latest dispatching result may be acquired periodically or in real time from the distribution proportion configuration center by the load balancer to dispatch the service request.

In embodiments of the present disclosure, the calculation process of the dispatching result is separated from the execution process of dispatching, and the dispatching result is provided in the distribution proportion configuration center. The load balancer can therefore quickly perform dispatching in real time. Further, the dispatching result is calculated based on the service traffic of the load balancer of each equipment room and the service capacity of each equipment room, so that the service request can be accurately distributed, to achieve the effect of load balancing.

Figure 3:
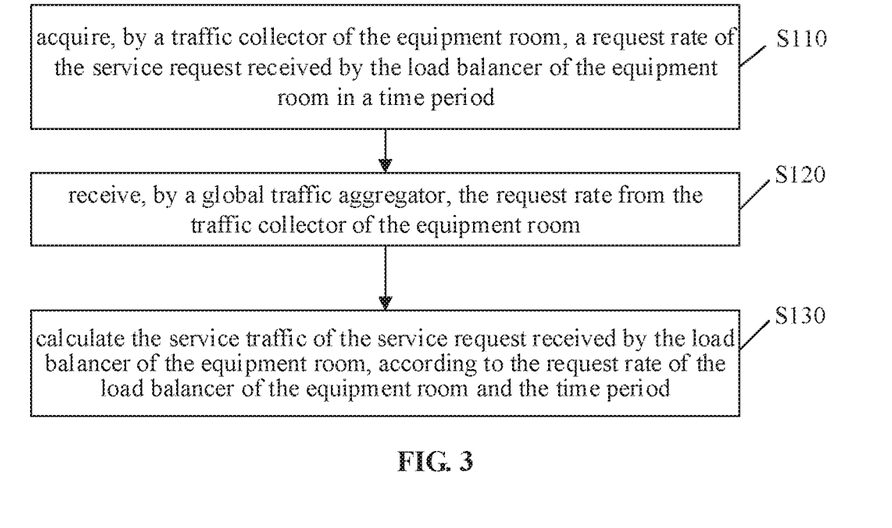
FIG. 3 is a schematic flowchart depicting a process for acquiring a service traffic according to an embodiment.

In a possible implementation, service traffic may be collected in a hierarchical aggregation manner. At least one traffic collector may be provided in each equipment room. One dispatcher and at least one global traffic aggregator may be provided in the dispatching center. As shown in FIG. 3, the process of acquiring the service traffic at S100 may include activities S110 to S130, specifically as follows:

At S110, a request rate of the service request received by the load balancer of the equipment room in a time period is acquired by a traffic collector of the equipment room.

The request rate of the service request received by the load balancer can be counted in real time by the load balancer of each equipment room. While the request rate is transmitted by the load balancer to the traffic collector of the corresponding equipment room, the transmitted data may further include data such as a service domain name, an identifier of the load balancer, and an equipment room where the load balancer is located. For example, the service domain name can be represented as "service: www.example-.com", the identifier of the load balancer can represented as "instance: bj-171b-01", the equipment room where the load balancer cluster can be located is represented as "idc: bj", and, the request rate in the past one time period is represented as "rate: 100", in units of Queries Per Second (QPS). The traffic collector conducts statistical analysis of request rates sent from load balancers in the equipment room, and then sends to the global traffic aggregator.

At S120, the request rate from the traffic collector of the equipment room is received by the global traffic aggregator.

Similarly, while the request rates are sent by traffic collectors to the global traffic aggregator, the data sent by each traffic collector may further include data such as a service domain name, an identifier of the traffic collector, and an equipment room where the traffic collector is located, and so on.

Because a plurality of traffic collectors can be provided in the same equipment room, traffic data from a plurality of traffic collectors in the same equipment room can be received by the global traffic aggregator. Therefore, each equipment room can have an associated plurality of traffic data streams, and one of the plurality of traffic data streams covering the largest number of load balancers can be selected by the global traffic aggregator as the traffic data stream corresponding to this equipment room within a given time limit, for example, one minute. When the plurality of traffic data streams each cover the same number of load balancers, the first traffic data stream received can be selected. Finally, the selected request rates of the equipment rooms can be transmitted to the dispatcher by the global traffic aggregator. The dispatcher may perform step S130 to obtain the service traffic of the load balancer of each equipment room.

At S130, the service traffic of the service request received by the load balancer of equipment room is calculated, according to the request rate of the load balancer of the equipment room and the time period.

For example, where the request rate of the load balancer in an equipment room A is 1000 QPS and the time period is 1 minute, a service traffic of the service request received by the load balancer in the equipment room A is 60000 (the product of 1000 QPS and 60 seconds).

After acquiring the service traffic of the service request received by the load balancer of each equipment room, the dispatching result may be calculated in combination with the service capacity of each equipment room. The process of calculation can satisfies the a number of requirements.

For example, when the service capacity of the same equipment room is sufficient, it is preferred to distribute the service request to the same equipment room. When the service capacity in the same equipment room is insufficient, other equipment rooms with redundant capacity are searched for distribution. Further, when the global traffic exceeds the global capacity, the excess traffic is equally distributed or discarded.

Therefore, global traffic and global capacity are counted by the dispatcher in advance, and the dispatching policy of equal distribution or discarding can be selected when global traffic exceeds global capacity. Then, the proportion of distribution to the same equipment room and the proportion of distribution to at least one different equipment room can be calculated by the dispatcher in compliance with the first and the second requirements mentioned above, respectively. Specifically, the above process may include: counting a global traffic according to the service traffics of the service requests received by the load balancers of equipment rooms; counting a global capacity according to the service capacities of the equipment rooms; determining whether the global traffic is greater than the global capacity; and adjusting the service capacities of the equipment rooms in a case that the global traffic is larger than the global capacity.

For example, when the system for processing the service requests includes the equipment rooms A, B and C, the service traffics in the equipment rooms are 500, 1000 and 500, respectively, and the service capacities in the equipment rooms are 300, 500 and 200, respectively, the global traffic is 2000 and the global capacity is 1000. At this time, it is determined that the global traffic exceeds the global capacity.

When the global traffic exceeds the global capacity and a choice is made to equally distribute the excess traffic, the service capacity needs to be readjusted before the equal distribution, then the distribution proportion can be calculated again. In a case that the global traffic does not exceed the global capacity, or a choice is made to discard the excess traffic when the global traffic exceeds the global capacity, the service capacity may not be adjusted, and the dispatching result may be directly calculated at S200.

In a possible implementation, the process for adjusting the service capacities of the equipment rooms may include: firstly, dividing the global traffic by the global capacity to acquire a global load coefficient; next, multiplying the service capacities of the equipment rooms by the global load coefficient to acquire the adjusted service capacities of the equipment rooms. After the service capacities are adjusted, step S200 is performed to calculate the proportion of distribution to the same equipment room and the proportion of distribution to at least one different equipment room by the load balancer of each equipment room.

Following the above example, when the global traffic is 2000 and the global capacity is 1000, the global load coefficient is 2, the adjusted service capacities of the equipment rooms A, B and C are 600, 1000 and 400, respectively.

Figure 4:
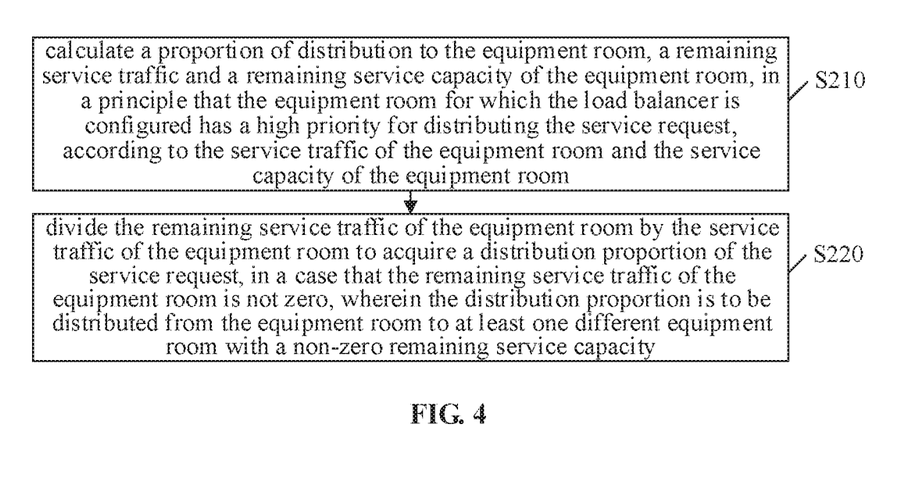
FIG. 4 is a schematic flowchart depicting a calculation process of a dispatching result according to an embodiment.

In a possible implementation, as shown in FIG. 4, the calculation of the dispatching result at step S200 may include S210 and S220 as follows.

At S210, a proportion of distribution to the equipment room, a remaining service traffic and a remaining service capacity of the equipment room can calculated. The calculations can be based on the principle that the equipment room for which the load balancer is configured has a high priority for distributing the service request, according to the service traffic of the service request received by the load balancer of the equipment room and the service capacity of the equipment room.

At S220, if the remaining service traffic of the equipment room is not zero, the remaining service traffic of the equipment room can be divided by the service traffic of the equipment room to acquire a distribution proportion of the service request. The distribution proportion is to be distributed from the equipment room to at least one different equipment room with a non-zero remaining service capacity.

When the global traffic does not exceed the global capacity, the proportion of distribution to the equipment room and the proportion of distribution to at least one different equipment room can be directly calculated without adjusting the service capacity of each equipment room. When that the global traffic exceeds the global capacity, and the dispatching policy adopts global equal distribution, then S210 and S220 can be performed after the service capacity of each equipment room is readjusted. When the global traffic exceeds the global capacity, and the dispatching policy of discarding the excess traffic is chosen, any of S200, or S210 and step S220 may be performed first. Then, the distribution proportion of the service request in the equipment room distributed to at least one different equipment room in which the remaining service capacity is not zero is regarded as the discarding proportion of the service request in the equipment room discarded.

In one possible implementation, the above-described S210 may be performed in any one of the equipment rooms to calculate the proportion of distribution to the same equipment room, the remaining service traffic and remaining service capacity. The above-described S210 may be divided into the following scenarios.

In scenario 1, when the service traffic of the load balancer in the equipment room is not greater than the service capacity in the equipment room, the proportion of distribution to the same equipment room is 100%, the remaining service traffic is zero, and the remaining service capacity is a difference between the service capacity and the service traffic.

For example, in a case that the service traffic in the equipment room A is 400, and the service capacity is 500, the service requests received by the load balancer in the equipment room A are distributed to the equipment room A, that is, the proportion of distribution to the same equipment room is 100%. At this time, the remaining service traffic in the equipment room A is zero and the remaining service capacity is 100 (the difference between 500 and 400).

In scenario 2, when the service traffic is greater than the service capacity, the proportion of distribution to the equipment room is the ratio of the service capacity to the service traffic, the remaining service traffic in the equipment room is the difference between the service traffic and the service capacity, and the remaining service capacity in the equipment room is zero.

For example, when the service traffic in the equipment room A is 1000 and the service capacity therein is 500, then 500 of the service traffic may be distributed to the equipment room. In the equipment room A, the proportion of distribution to the same equipment room is 50% (ratio of 500 to 1000), that is, half of service requests received by the load balancer in the equipment room A will be distributed to the equipment room A. At this time, the remaining service traffic in the equipment room A is 500 (the difference between 1000 and 500), the remaining service capacity in the equipment room A is zero, and the remaining service traffic in the equipment room A needs to be distributed to any other equipment room with redundant service capacity. Then, the proportion of distribution from the equipment room A to at least one different equipment room in which the remaining service capacity is not zero is 50% (the ratio of the remaining service traffic of 500 to the service traffic of 1000).

Figure 5:
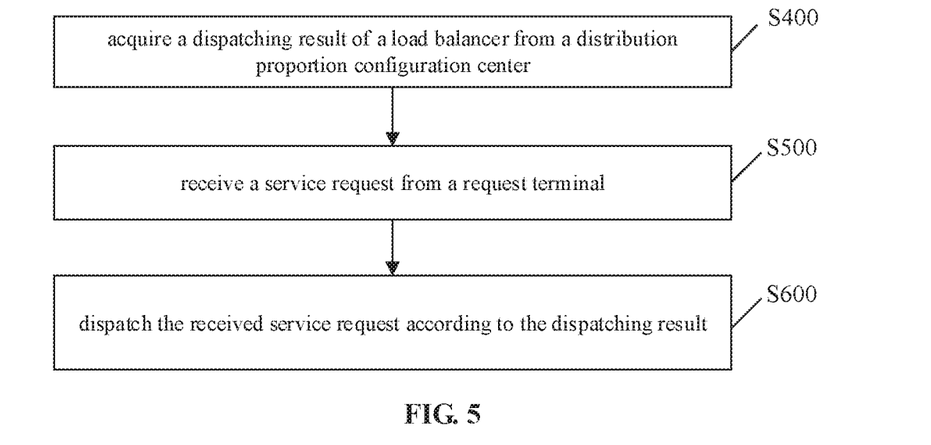
FIG. 5 is a schematic flowchart depicting a method for load balancing according to an embodiment.

The dispatcher may calculate the dispatching result and push the dispatching result to the distribution proportion configuration center for storage. The latest dispatching result may be periodically acquired by the load balancer from the distribution proportion configuration center for dispatch. With reference to FIG. 5, a method for load balancing is provided according to an embodiment of the present disclosure, which may be applied to a load balancer.

At S400, a dispatching result of a load balancer is acquired from the distribution proportion configuration center. The dispatching result is used to indicate to the load balancer to distribute a service request to one or more equipment rooms, and is acquired according to a service traffic of the service request received by at least one load balancer configured for an equipment room of a plurality of equipment rooms and a service capacity of the equipment room.

The dispatching result may be acquired in real time or periodically by the load balancer from the distribution proportion configuration center.

At S500, a service request from a request terminal is received. The request terminal may include a user terminal such as a mobile phone, a smart watch, a tablet, a computer. The service request may include one or more of a specific content of the request, an address of the request terminal and a user identifier, etc.

At S600, the received service request is dispatched according to the dispatching result.

Figure 6:
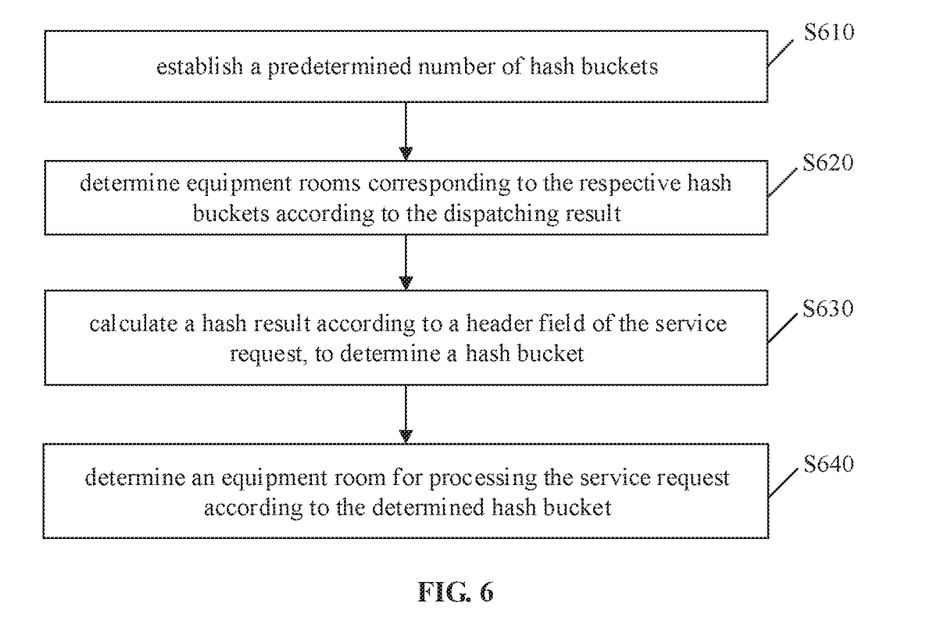
FIG. 6 is a schematic flowchart depicting a dispatching execution process according to an embodiment.

In a possible implementation, as shown in FIG. 6, in above-described S600, the execution process of dispatching may include S610 to S640, as follows:

At S610, a predetermined number of hash buckets are established. For example, 100, 200, or 300 hash buckets may be established.

At S620, equipment rooms corresponding to the respective hash buckets are determined according to the dispatching result.

For example, when the service request is processed by the load balancer in the equipment room A, the dispatching result includes the proportion of distribution to the same equipment room of 70%, and the proportion of distribution to at least one different equipment room of 30%. When the total number of hash buckets is 100, 70 of 100 hash buckets correspond to the equipment room A. In a case that the equipment room with the redundant service capacity is the equipment room B, the other 30 of the 100 hash buckets correspond to the equipment room B.

At S630, a hash result is calculated according to a header field of the service request, to determine a hash bucket.

In this embodiment, the header field may include the address of the request terminal or the user identifier, one of which may be used to perform a hash calculation.

At S640, an equipment room for processing the service request is determined according to the determined hash bucket.

Figure 7:
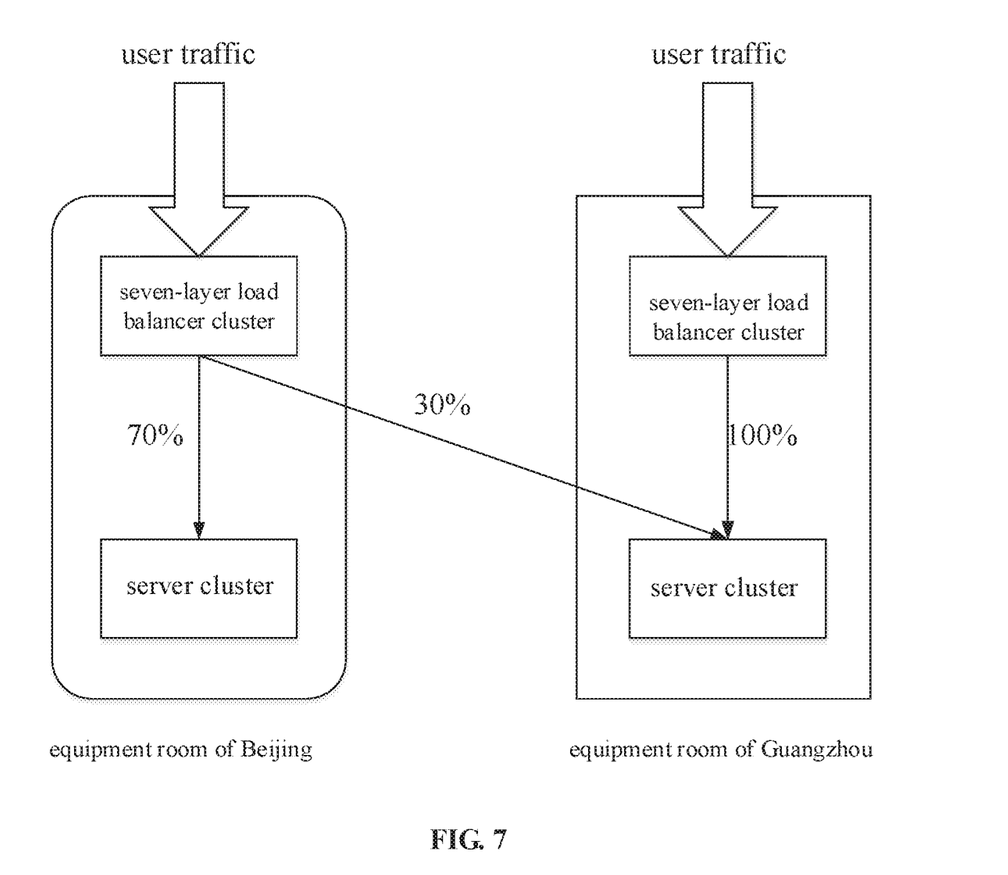
FIG. 7 is a schematic diagram depicting an application example of dispatching execution of a seven-layer load balancer according to an embodiment.
Figure 8:
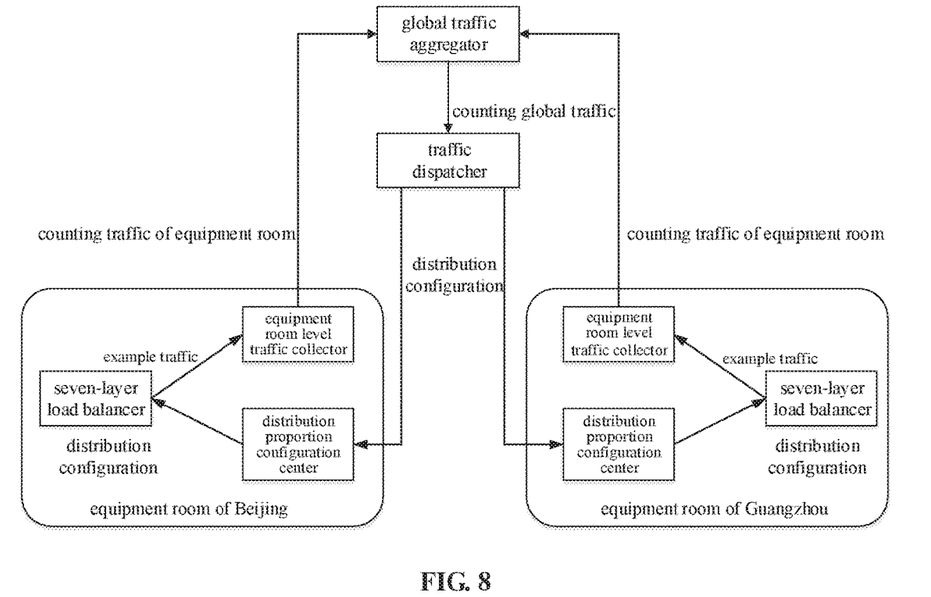
FIG. 8 is a schematic diagram depicting an application example of a service traffic collection flow according to an embodiment.
Figure 9:
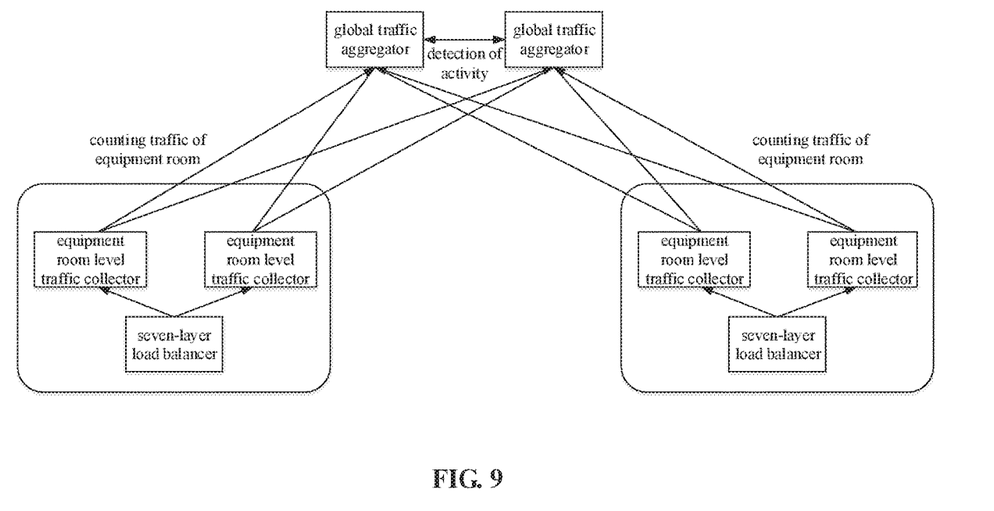
FIG. 9 is a schematic diagram depicting an application example of a service traffic collection architecture according to an embodiment.

With reference to FIGS. 7 to 9, FIG. 7 is a schematic diagram depicting an application example of execution of dispatching in a seven-layer load balancer according to the present disclosure, FIG. 8 is a schematic diagram depicting an application example of a service traffic collection flow according to the present disclosure, and FIG. 9 is a schematic diagram depicting an application example of a service traffic collection architecture according to the present disclosure. The present embodiment is described by using a seven-layer load balancer cluster as an example. The traffic of each equipment room is based on access of a cluster formed by a seven-layer load balancer. A global dispatching center collects the traffic data and configuration capacity from the seven-layer load balancer in real time, to determine the distribution proportion of the service request distributed by the seven-layer load balancer cluster to at least one equipment room. In this way, load balancing, stop-loss dispatching can be realized.

As shown in FIG. 7, user traffic (i.e., service traffic) is based on access of a seven-layer load balancer cluster in the equipment rooms of Beijing and Guangzhou. The dispatching result in the equipment room of Beijing is that the proportion of distribution to the same equipment room is 70%, and the proportion of distribution to a different equipment room (i.e., the equipment room of Guangzhou) is 30%. The dispatching result in the equipment room of Guangzhou is that the proportion of distribution to the same equipment room is 100%. Therefore, 70% of the received user traffic in the equipment room of Beijing is transmitted to the server cluster in the equipment room of Beijing, and 30% of the received user traffic is transmitted to the server cluster in the equipment room of Guangzhou.

In conjunction with FIGS. 8 and 9, the process of traffic collection, dispatching calculation and dispatching execution in the present embodiment will be described in detail below. The traffic collection includes a collection process and a collection architecture.

I. Traffic Collection

1. Traffic Collection by Hierarchical Aggregation.

1-1. The seven-layer load balancer conducts statistics of the service traffic received by the seven-layer load balancer, and transmits the real-time statistical data to an equipment room level traffic collector. For example, the format of the transmitted statistical data may be referred to as follows:

```
{
    "service": "www.example.com" // Service domain name;
    "instance": "bj-17lb-01", // Seven-layer load balancer name;
    "rate": 100, // Request rate in the past one cycle, in unit of QPS;
    "idc": "bj", // Identifier of the equipment room where the
seven-layer load balancer is located;
}
```

1-2. The collected statistical data are transmitted to a global traffic aggregator by each equipment room level traffic collector. For example, the format of the transmitted statistical data may be referred to as follows:

```
{
    "service": "www.example.com" // Service domain name;
    "rate": 1000, // Request rate in the past one cycle, in unit of QPS;
    "idc": "bj", // Identifier of the equipment room where the
seven-layer load balancer cluster is located;
}
```

1-3. The global traffic aggregator counts the sum of the request rates of equipment rooms according to the equipment rooms, and transmits the sum of the request rates of the equipment rooms to the dispatcher. For example, the format of the data transmitted by the global traffic aggregator to the dispatcher may be referred to as follows:

```
{
    "service": "www.example.com" // Service domain name;
    "idcRateMap": {
        "bj": 1000,
        "gz": 2000,}// Request rate of each equipment room in the
past one cycle, in unit of QPS;
}
```

2. A collection architecture of service traffic, which is a highly redundant architecture, can avoid failure of a single collector leading to disruption or suspension of traffic collection.

Each equipment room can include at least two separate equipment room level traffic collectors, the statistic service traffic may be simultaneously transmitted to the traffic collectors of the equipment room by the seven-layer load balancer in the equipment room.

At least two global traffic aggregators can be arranged in the dispatching center, the statistic service traffics in equipment room level traffic collectors can be aggregated and then sent to all of the global traffic aggregators.

A primary-secondary relationship can be provided between the global traffic aggregators, and the current primary global traffic aggregator is determined by mutual detection of activity. The primary global traffic aggregator is responsible for sending the aggregated traffic data to the traffic dispatcher.

It should be noted that since a plurality of traffic collectors can be provided in the same equipment room, data from the plurality of traffic collectors in the same equipment room can be received by the global traffic aggregator. At this time, the same equipment room corresponds to a plurality of data, and one of the plurality of data covering the maximum number of load balancers within a given time limit (for example, one minute) may be selected by the global traffic aggregator as the data corresponding to this equipment room. In a case that the plurality of data each cover the same number of load balancers, one of the plurality of data first received is selected.

II. Dispatching Calculation

1. The proportion of distribution to at least one back-end equipment room from each seven-layer load balancer may be calculated by the traffic dispatcher according to the real-time collected traffic data and the service capacity of each equipment room. The calculation process may follow the following principles:

When the service capacity in the same equipment room is sufficient, distribution to the same room is preferred.

When the service capacity in the same room is insufficient, other equipment rooms with redundant capacity are searched for distribution.

When the global traffic exceeds the global capacity, the excess traffic is equally distributed or discarded.

2. Calculation Process of the Traffic Dispatcher can Proceed as Follows:

The proportion of distribution to the same equipment room from the seven-layer load balancer cluster of each equipment room is calculated. For the seven-layer load balancer cluster of each equipment room, the distribution proportion of the service request distributed by the seven-layer load balancer cluster in this equipment room to a server cluster in the same equipment room (i.e., the proportion of distribution to the equipment room) is calculated based on the service traffic and service capacity of this equipment room.

For example, assuming that the service capacity of the equipment room A is 500, examples are given as follows:

a) When the service traffic of the seven-layer load balancer cluster in the equipment room A is 400, all of the service traffic can be distributed to the same equipment room, thus the proportion of distribution to the equipment room is 100%, and the remaining service traffic is 0.

b) When the service traffic of the seven-layer load balancer cluster in the equipment room A is 1000, only 500 of the service traffic can be distributed to the same equipment room, thus the proportion of distribution to the equipment room is 500/1000=50%, and the remaining service traffic is 500.

When all of service traffic is distributed to the same equipment room from the seven-layer load balancer cluster, the distribution of the service traffic has been completed, and the calculation ends. In a case that the remaining service traffic in the equipment room is not zero and the global traffic does not exceed the global capacity, the distribution proportion of the service traffic distributed to at least one different equipment room (i.e., the proportion of distribution to at least one different equipment room) is calculated in connection with the remaining service capacities in the other equipment rooms.

For example, assuming that there are both the equipment room A and the equipment room B, and the service capacities of both are 500, calculation can proceed as follows:

a) When the service traffic of the seven-layer load balancer cluster of each of the equipment room A and the equipment room B is 400, the remaining service traffic of each of the room A and the room B is 0, the distribution of the service traffic has been completed, and the calculation ends.

b) When the service traffic of the seven-layer load balancer cluster in the equipment room A is 400, and the service traffic of the seven-layer load balancer cluster in the equipment room B is 550, the remaining service traffic in the equipment room A is 0 and the remaining service capacity in the equipment room A is 100; the remaining service traffic in the equipment room B is 50, and the remaining service capacity in the equipment room B is 0. At this time, 50 of the remaining service traffic of the equipment room B may be distributed to the equipment room A. The calculation process of the distribution proportion of the service request distributed by the seven-layer load balancer cluster in the equipment room B to the server cluster in the equipment room A may be expressed as: B→A distribution proportion=50/550=9%.

When the remaining service traffic in the equipment room is not zero, and the global traffic exceeds the global capacity, the distribution proportion of the service traffic in this equipment room allocable to another equipment room (i.e., the proportion of distribution to at least one different equipment room) or the discard proportion is calculated in connection with the dispatching policy of the equal distribution or discarding.

In a case that the dispatching policy is global equal distribution, global traffic is divided by global capacity to obtain the global load coefficient. Then, the service capacity of each equipment room is multiplied by the global load coefficient to obtain the adjusted service capacity. Finally, the distribution proportion of each equipment room is calculated in connection with the adjusted service capacity.

As an example, assuming that the service capacities of the equipment room A and the equipment room B are each 500, and the service traffics thereof are 500 and 1000, respectively. The following operations can be performed:

a) The proportion of distribution to the same equipment room by a seven-layer load balancer cluster of each of the equipment room A and the equipment room B is calculated. The proportion of distribution to the same equipment room in the equipment room A is 100%, the proportion distribution to the same equipment room in the equipment room B is 50%, and the remaining service traffic in the equipment room B is 500.

b) There is also remaining traffic of 500 in the equipment room B and global traffic exceeds global capacity. At this time, the global load coefficient is calculated to be 1500/1000=1.5, and the service capacities of the equipment room A and the equipment room B are multiplied by a coefficient of 1.5, to obtain the adjusted service capacities of 750 and 750, respectively.

c) After the service capacities are adjusted, the remaining service capacities in the equipment room A and the equipment room B are 250 and 250, respectively. The remaining service traffic of 500 in the equipment room B may be distributed to the equipment room A and equipment the room B, and the proportion of the service request distributed to the server cluster of each of the equipment room A and equipment room B by the seven-layer load balancer in the equipment room B is recomputed.

The proportion of the service request distributed to the server cluster in the equipment room A by the seven-layer load balancer in the equipment room B (the proportion of distribution to a different equipment room in the equipment room B) is: B→A=250/1000=25%; the proportion of service requests distributed to the server cluster in equipment room B by the seven-layer load balancer in the equipment room B (the proportion of distribution to the same equipment room in the equipment room B) is: B→B=(500+250)/1000=75%.

When the dispatching policy is discarding, the proportion of the discarded service traffic can be calculated. The distribution proportion of the service request distributed to at least one different equipment room with a non-zero remaining capacity from the equipment room with a non-zero remaining service traffic is taken as a discarding proportion of the service request discarded by the load balancer in the equipment room.

III. Dispatching Execution

The traffic dispatcher can push the calculated dispatching result to the distribution proportion configuration center. The latest dispatching result can be acquired periodically from the distribution proportion configuration center by the seven-layer load balancer of each equipment room.

For each service request, the equipment room for processing the service request is determined by the seven-layer load balancer according to the latest dispatching result and the header field of the service request. For example, a service request may be transmitted to a seven-layer load balancer based on HyperText Transfer Protocol (HTTP), and the header field of HTTP may be used to determine the equipment room for processing the service request.

As an example the dispatching process of the seven-layer load balancer may be as follows:

Firstly, 100 hash buckets are established, and an equipment room corresponding to each hash buckets is determined according to the dispatching result. For example, in a case that the distribution proportion of a service request distributed by the seven-layer load balancer to the equipment room of Beijing is 70% and the distribution proportion of a service request distributed by the seven-layer load balancer to the equipment room of Guangzhou is 30%, 70 hash buckets are selected to correspond to the equipment room of Beijing and 30 hash buckets are selected to correspond to the equipment room of Guangzhou.

Then, a hash result is calculated according to the request-end IP address of the header field or another user identifier, to determine a hash bucket. And an equipment room corresponding to the determined hash bucket is regarded as the equipment room for processing the service request.

The present embodiment has the following advantages:

1. Fast effectiveness: The dispatching center brings the dispatching result into effect according to the service traffic of the seven-layer load balancer and the service capacity of each equipment room, which is separate from the dispatching execution process of the seven-layer load balancer, and the dispatching result can take effect quickly. In addition, a rapid stop of loss can be achieved in the case of a fault.

2. Dispatching precision: The dispatching result is brought into effect according to the service traffic of the seven-layer load balancer and the service capacity of each equipment room. The effect of load balancing can be achieved without being affected by dispatching the service request by region of the user.

Figure 10:
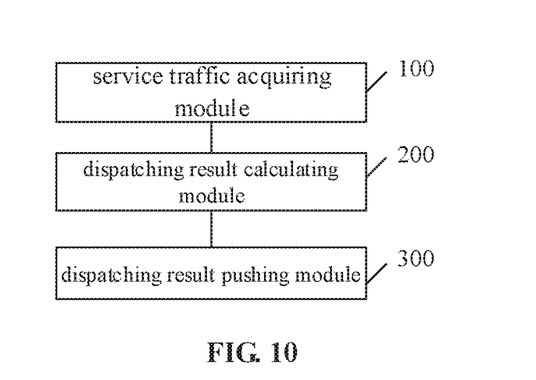
FIGS. 10 and 11 are schematic flowcharts depicting a device for load balancing according to an embodiment.

With reference to FIG. 10, a device for load balancing is provided according to an embodiment of the present disclosure, the device includes:

a service traffic acquiring module 100, configured to acquire a service traffic of a service request received by at least one load balancer configured for an equipment room of a plurality of equipment rooms;

a dispatching result calculating module 200, configured to acquire a dispatching result of the load balancer, according to the service traffic of the service request and a service capacity of the equipment room; and a dispatching result pushing module 300, configured to push the dispatching result to a distribution proportion configuration center configured to send the latest dispatching result to the load balancer, wherein the dispatching result is used to indicate the load balancer to distribute the service request to one or more equipment rooms.

In a possible implementation, the service traffic acquiring module 100 includes:

a request rate acquiring unit, configured to acquire, by a traffic collector of the equipment room, a request rate of the service request received by the load balancer of the equipment room in a time period;

a global rate aggregation unit, configured to receive, by a global traffic aggregator, the request rate from the traffic collector of the equipment room;

a service traffic calculation unit, configured to calculate the service traffic of the service request received by the load balancer of the equipment room, according to the request rate of the load balancer of the equipment room and the time period.

In a possible implementation, the device further includes:

a global traffic counting module, configured to count a global traffic according to the service traffics of the service requests received by the load balancers in equipment rooms;

a global capacity counting module, configured to count a global capacity according to the service capacities of the equipment rooms;

an excess determining module, configured to determine whether the global traffic is greater than the global capacity; and a service capacity adjusting module, configured to adjust the service capacities of the equipment rooms in a case that the global traffic is larger than the global capacity.

In a possible implementation, the service capacity adjusting module further includes:

a global load coefficient unit, configured to divide the global traffic by the global capacity to acquire a global load coefficient;

an adjusting unit, configured to multiply the service capacities of the equipment rooms by the global load coefficient to acquire the adjusted service capacities of the equipment rooms.

In a possible implementation, the dispatching result calculating module 200 includes:

a first calculating unit, configured to calculate a proportion of distribution to the equipment room, a remaining service traffic and a remaining service capacity of the equipment room, in a principle that the equipment room for which the load balancer is configured has a high priority for distributing the service request, according to the service traffic of the service request received by the load balancer of the equipment room and the service capacity of the equipment room; and a second calculating unit, configured to divide the remaining service traffic of the equipment room by the service traffic of the equipment room to acquire a distribution proportion of the service request, in a case that the remaining service traffic of the equipment room is not zero, wherein the distribution proportion is to be distributed from the equipment room to at least one different equipment room with a non-zero remaining service capacity.

In a possible implementation, the first calculating unit is configured to: in a case that the service traffic of the load balancer of the equipment room is not greater than the service capacity of the equipment room, set the proportion of distribution to the equipment room for which the load balancer is configured to be 100%, the remaining service traffic of the equipment room to be zero, and the remaining service capacity of the equipment room to be a difference between the service capacity and the service traffic; and in a case that the service traffic is greater than the service capacity, set the proportion of distribution to the equipment room for which the load balancer is configured to be a ratio of the service capacity to the service traffic, the remaining service traffic in the equipment room to be a difference between the service traffic and the service capacity, and the remaining service capacity of the equipment room to be zero.

In a possible implementation, the device further includes:

a discarding proportion calculating module, configured to, in a case that the global traffic is greater than the global capacity, calculate a distribution proportion of the service request as a discarding proportion of the service request discarded by the load balancer of the equipment room, wherein the distribution proportion is to distributed from the equipment room to at least one different equipment room with a non-zero remaining capacity.

Figure 11:
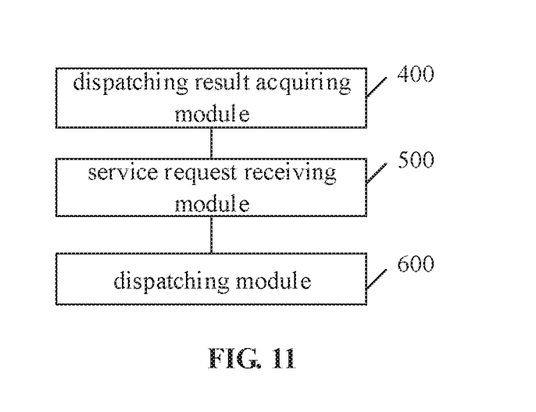

With reference to FIG. 11, a device for load balancing is further provided in the present disclosure, includes:

a dispatching result acquiring module 400, configured to acquire a dispatching result of a load balancer from a distribution proportion configuration center, wherein the dispatching result is used to indicate the load balancer to distribute a service request to one or more equipment rooms, and is acquired according to a service traffic of the service request received by at least one load balancer configured for an equipment room of a plurality of equipment rooms and a service capacity of the equipment room;

a service request receiving module 500, configured to receive a service request from a request terminal;

a dispatching module 600, configured to dispatch the received service request according to the dispatching result.

In a possible implementation, the dispatching module 600 includes:

a hash bucket establishing unit, configured to establish a predetermined number of hash buckets;

an equipment room correspondence unit, configured to determine equipment rooms corresponding to the respective hash buckets according to the dispatching result;

a hash bucket determining unit, configured to calculate a hash result according to a header field of the service request, to determine a hash bucket; and an equipment room determining unit, configured to determine an equipment room for processing the service request according to the determined hash bucket.

The functions of the device may be implemented by hardware, or may be implemented by hardware executing corresponding software. The hardware or software comprises one or more modules corresponding to the functions described above.

In a possible design, the configuration for load balancing includes a processor and a memory configured to execute a program for load balancing in the first aspect of the above-described device for load balancing, the processor configured to execute the program stored in the memory. The device of load balancing may further include a communication interface for communication between the device of load balancing and other apparatus or communication networks.

Figure 12:
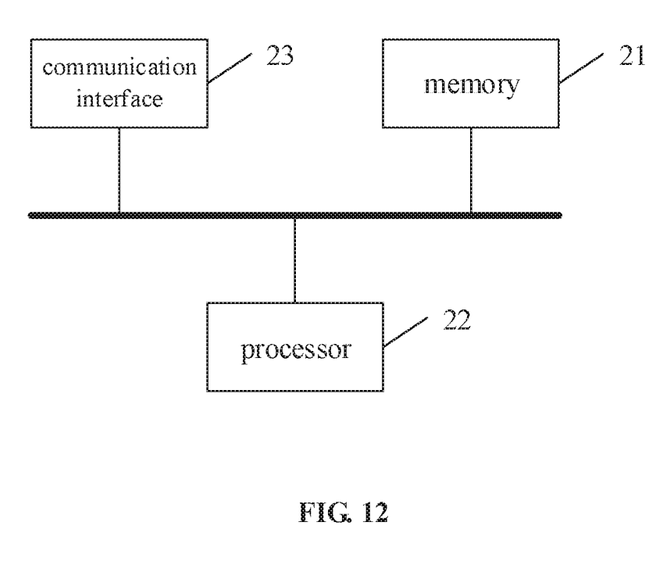
FIG. 12 is a schematic structural diagram depicting a terminal apparatus according to an embodiment.

As shown in FIG. 12, a terminal apparatus for load balancing is provided according to an embodiment of the present disclosure. The apparatus includes a memory 21 and a processor 22. The memory 21 stores a computer program executable on the processor 22. When the processor 22 executes the computer program, the method for load balancing in the foregoing embodiment is implemented. The number of the memory 21 and the processor 22 may be one or more.

The Apparatus Further Includes:

a communication interface 23 for communication between the processor 22 and an external device.

The memory 21 may include a high-speed RAM memory and may also include a non-volatile memory, such as at least one magnetic disk memory.

If the memory 21, the processor 22, and the communication interface 23 are implemented independently, the memory 21, the processor 22, and the communication interface 23 may be connected to each other through a bus and communicate with one another. The bus may be an Industry Standard Architecture (ISA) bus, a Peripheral Component Interconnect (PCI) bus, an Extended Industry Standard Component (EISA) bus, or the like. The bus may be divided into an address bus, a data bus, a control bus, and the like. For ease of illustration, only one bold line is shown in FIG. 12, but it does not mean that there is only one bus or one type of bus.

Optionally, in a specific implementation, if the memory 21, the processor 22, and the communication interface 23 are integrated on one chip, the memory 21, the processor 22, and the communication interface 23 may implement mutual communication through an internal interface.

According to an embodiment of the present disclosure, a computer-readable storage medium is provided for storing computer software instructions, which include programs involved in execution of the above method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present disclosure. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present disclosure, "a plurality of" means two or more, unless expressly limited otherwise.

Any process or method descriptions described in traffic charts or otherwise herein may be understood as representing modules, segments or portions of code that include one or more executable instructions for implementing the steps of a particular logic function or process. The scope of the preferred embodiments of the present disclosure includes additional implementations where the functions may not be performed in the order shown or discussed, including according to the functions involved, in substantially simultaneous or in reverse order, which should be understood by those skilled in the art to which the embodiment of the present disclosure belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically acquire the program, which is then stored in a computer memory.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present disclosure may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present disclosure, but not intended to limit the protection scope of the present disclosure. Those skilled in the art may easily conceive of various changes or modifications within the technical scope disclosed herein, all these should be covered within the protection scope of the present disclosure. Therefore, the protection scope of the present disclosure should be subject to the protection scope of the claims.

The invention claimed is:

1. A method for load balancing, comprising:
   acquiring a service traffic of a plurality of service requests received by a load balancer configured for an equipment room of a plurality of equipment rooms;
   acquiring a dispatching result of the load balancer, according to the service traffic of the plurality of service requests and a service capacity of the equipment room; and
   pushing the dispatching result to a distribution proportion configuration center configured to send the dispatching result to the load balancer, wherein the dispatching result is used to indicate to the load balancer to distribute a received service request to one or more equipment rooms of the plurality of equipment rooms.

2. The method according to claim 1, wherein acquiring a service traffic of a plurality of service requests comprises:
   acquiring, by a traffic collector of the equipment room, a request rate of the plurality of service requests received by the load balancer of the equipment room in a time period;
   receiving, by a global traffic aggregator, the request rate from the traffic collector of the equipment room; and
   calculating the service traffic of the plurality of service requests received by the load balancer of the equipment room, according to the request rate of the load balancer of the equipment room and the time period.

3. The method of claim 1, further comprising:
   counting a global traffic according to the service traffics of the service requests received by the load balancer of each of the plurality of equipment rooms;
   counting a global capacity according to a service capacity of each of the plurality of equipment rooms;
   determining whether the global traffic is greater than the global capacity; and
   adjusting the service capacity of each of the plurality of equipment rooms when the global traffic is larger than the global capacity.

4. The method according to claim 3, wherein adjusting the service capacity of each of the plurality of equipment rooms comprises:
   dividing the global traffic by the global capacity to acquire a global load coefficient;
   multiplying the service capacity of each of the plurality of equipment rooms by the global load coefficient to acquire the adjusted service capacity of the equipment room.

5. The method according to claim 1, wherein acquiring a dispatching result of the load balancer, according to the service traffic of the plurality of service requests and a service capacity of the equipment room comprises:
   calculating a proportion of distribution to the equipment room, a remaining service traffic and a remaining service capacity of the equipment room, based on a principle that the equipment room for which the load balancer is configured has a high priority for distributing the service request, according to the service traffic of the plurality of service requests received by the load balancer of the equipment room and the service capacity of the equipment room; and
   dividing the remaining service traffic of the equipment room by the service traffic of the equipment room to acquire a distribution proportion of the service request, in a case that the remaining service traffic of the equipment room is not zero, wherein the distribution proportion is to be distributed from the equipment room to at least one different equipment room with a non-zero remaining service capacity.

6. The method according to claim 5, wherein calculating a proportion of distribution to the equipment room, a remaining service traffic and a remaining service capacity of the equipment room comprises:
   when the service traffic of the load balancer of the equipment room is not greater than the service capacity of the equipment room, setting the proportion of distribution to the equipment room for which the load balancer is configured to be 100%, the remaining service traffic of the equipment room to be zero, and the remaining service capacity of the equipment room to be a difference between the service capacity and the service traffic; and
   when the service traffic is greater than the service capacity, setting the proportion of distribution to the equipment room for which the load balancer is configured to be a ratio of the service capacity to the service traffic, the remaining service traffic in the equipment room to be a difference between the service traffic and the service capacity, and the remaining service capacity of the equipment room to be zero.

7. The method of claim 3, further comprising:
   when the global traffic is greater than the global capacity, calculating a distribution proportion of the service request as a discarding proportion of the service request discarded by the load balancer of the equipment room, wherein the distribution proportion is to distributed from the equipment room to at least one different equipment room with a non-zero remaining capacity; and
   discarding the service request according to the discarding proportion of the service request.

8. A method for load balancing, comprising:
   acquiring a dispatching result of a load balancer from a distribution proportion configuration center, wherein the dispatching result is used to indicate the load balancer to distribute a service request to one or more equipment rooms, and is acquired according to a service traffic of a plurality of service requests received by at least one load balancer configured for an equipment room of a plurality of equipment rooms and a service capacity of the equipment room;
   receiving a service request from a request terminal; and
   dispatching the received service request according to the dispatching result.

9. The method according to claim 8, wherein dispatching the received service request according to the dispatching result comprises:
   establishing a predetermined number of hash buckets;

determining equipment rooms corresponding to the respective hash buckets according to the dispatching result;

calculating a hash result according to a header field of the service request, to determine a hash bucket; and determining an equipment room for processing the service request according to the determined hash bucket.

10. A device for load balancing, comprising:
one or more processors; and
a storage device configured to store one or more programs, that, when executed by the one or more processors, cause the one or more processors to:
acquire a service traffic of a plurality of service requests received by a load balancer configured for an equipment room of a plurality of equipment rooms;
acquire a dispatching result of the load balancer, according to the service traffic of the service request and a service capacity of the equipment room; and
push the dispatching result to a distribution proportion configuration center configured to send the dispatching result to the load balancer, wherein the dispatching result is used to indicate the load balancer to distribute a received service request to one or more equipment rooms.

11. The device according to claim 10, wherein the one or more programs, when executed by the one or more processors, cause the one or more processors further to:
count a global traffic according to the service traffics of the service requests received by the load balancer of each of the plurality of equipment rooms;
count a global capacity according to the service capacities of each of the plurality of equipment rooms;
determine whether the global traffic is greater than the global capacity; and
adjust the service capacities of each of the plurality of equipment rooms in a case that the global traffic is larger than the global capacity.

12. The device according to claim 10, wherein the one or more programs, when executed by the one or more processors, cause the one or more processors further to:
calculate a proportion of distribution to the equipment room, a remaining service traffic and a remaining service capacity of the equipment room, in a principle that the equipment room for which the load balancer is configured has a high priority for distributing the service request, according to the service traffic of the service request received by the load balancer of the equipment room and the service capacity of the equipment room; and
divide the remaining service traffic of the equipment room by the service traffic of the equipment room to acquire a distribution proportion of the service request, in a case that the remaining service traffic of the equipment room is not zero, wherein the distribution proportion is to be distributed from the equipment room to at least one different equipment room with a non-zero remaining service capacity.

13. A device for load balancing, comprising:
one or more processors; and
a storage device configured to store one or more programs, that, when executed by the one or more processors, cause the one or more processors to:
acquire a dispatching result of a load balancer from a distribution proportion configuration center, wherein the dispatching result is used to indicate the load balancer to distribute a received service request to one or more equipment rooms, and is acquired according to a service traffic of a plurality of service requests received by at least one load balancer configured for an equipment room of a plurality of equipment rooms and a service capacity of the equipment room;
receive a service request from a request terminal; and
dispatch the received service request according to the dispatching result.

14. The device according to claim 13, wherein the one or more programs, when executed by the one or more processors, cause the one or more processors further to:
establish a predetermined number of hash buckets;
determine equipment rooms corresponding to the respective hash buckets according to the dispatching result;
calculate a hash result according to a header field of the service request, to determine a hash bucket; and
determine an equipment room for processing the received service request according to the determined hash bucket.

15. A non-transitory computer-readable storage medium, in which a computer program is stored, wherein the computer program, when executed by a processor, causes the processor to implement a method comprising:
acquiring a service traffic of a plurality of service requests received by a load balancer configured for an equipment room of a plurality of equipment rooms;
acquiring a dispatching result of the load balancer, according to the service traffic of the plurality of service requests and a service capacity of the equipment room; and
pushing the dispatching result to a distribution proportion configuration center configured to send the dispatching result to the load balancer, wherein the dispatching result is used to indicate to the load balancer to distribute a received service request to one or more equipment rooms of the plurality of equipment rooms.

* * * * *